United States Patent
Horiguchi (10) Patent No.: US 10,632,993 B2
(45) Date of Patent: Apr. 28, 2020

(54) TRAVEL CONTROL APPARATUS FOR VEHICLE

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 284 days.

(21) Appl. No.: 15/427,770

(22) Filed: Feb. 8, 2017

(65) Prior Publication Data

US 2017/0259817 A1    Sep. 14, 2017

(30) Foreign Application Priority Data

Mar. 9, 2016    (JP) ................................. 2016-046048
Dec. 15, 2016    (JP) ................................. 2016-243092

(51) Int. Cl.
     *B60W 30/095*      (2012.01)
     *G05D 1/00*      (2006.01)
     (Continued)

(52) U.S. Cl.
     CPC ........ *B60W 30/0956* (2013.01); *B60W 30/08* (2013.01); *B60W 30/18145* (2013.01);
     (Continued)

(58) Field of Classification Search
     CPC ......... B60W 30/0956; B60W 2550/10; B60W 30/08; B60W 30/0953; B60W 2520/10;
     (Continued)

(56) References Cited

U.S. PATENT DOCUMENTS

2004/0158377 A1*   8/2004   Matsumoto ......... B60T 8/17557
                                                                701/48
2005/0143889 A1*   6/2005   Isaji ...................... G08G 1/161
                                                                701/70

(Continued)

FOREIGN PATENT DOCUMENTS

JP         2005-189983 A     7/2005

*Primary Examiner* — Tuan C To
*Assistant Examiner* — Paul A Castro
(74) *Attorney, Agent, or Firm* — McDermott Will & Emery LLP (57) ABSTRACT

A travel control apparatus for a vehicle includes a travel environment information acquisition unit, a travel information detection unit, and a control unit. The acquisition unit acquires travel environment information of the vehicle, which is on a traveling environment of the vehicle. The detection unit detects travel information of the vehicle. The control unit performs self-driving control, on the basis the information. The control unit detects a relative distance between an oncoming vehicle and the vehicle, and performs turn control to cause the vehicle to make a turn while crossing ahead of the oncoming vehicle, in a case where the relative distance is not smaller than a preset threshold value. When the vehicle makes the turn, in a case where a traction control for preventing tire slippage by decreasing a drive torque is operated, the control unit increasingly corrects the preset threshold value in accordance with at least a tire grip state.

2 Claims, 4 Drawing Sheets

(51) Int. Cl.
*B60W 30/08* (2012.01)
*B60W 30/18* (2012.01)
*B60W 50/00* (2006.01)

(52) U.S. Cl.
CPC ..... *B60W 30/18154* (2013.01); *G05D 1/0088* (2013.01); *B60W 2050/0075* (2013.01); *B60W 2520/06* (2013.01); *B60W 2520/26* (2013.01); *B60W 2520/30* (2013.01); *B60W 2550/14* (2013.01); *B60W 2550/308* (2013.01); *B60W 2710/18* (2013.01); *B60W 2710/20* (2013.01)

(58) Field of Classification Search
CPC ......... B60W 2550/30; B60W 2520/14; B60W 2420/42; B60W 2420/52; B60W 10/184; B60W 2540/18; B60W 2550/302; B60W 2550/308; B60W 40/105; B60W 50/0097; B60W 2520/12; B60W 30/143; B60W 10/04; B60W 2050/0026; B60W 2050/143; B60W 2520/06; B60W 2520/125; B60W 2520/16; B60W 2520/18; B60W 2550/12; B60W 2550/146; B60W 2550/148; B60W 2550/20; B60W 2710/20; B60W 2720/00; B60W 2750/308; B60W 30/00; B60W 30/095; B60W 30/10; B60W 30/14; B60W 30/18163; B60W 40/08; B60W 40/1005; B60W 40/114; B60W 50/085; B60W 2050/0071; B60W 2050/0089; B60W 2050/0095; B60W 2510/20; B60W 2520/105; B60W 2550/22; B60W 2550/402; B60W 2720/14; B60W 30/18154; B60W 40/04

See application file for complete search history.

(56) References Cited

U.S. PATENT DOCUMENTS

2017/0236413 A1\* 8/2017 Takagi ................... B60R 21/00
                                                          701/117
2018/0215378 A1\* 8/2018 Edo Ros ........... B60W 30/0956

\* cited by examiner

TRAVEL CONTROL APPARATUS FOR VEHICLE

CROSS-REFERENCE TO RELATED APPLICATIONS

The present application claims priority from Japanese Patent Application Nos. 2016-046048 filed on Mar. 9, 2016, and 2016-243092 filed on Dec. 15, 2016, the entire contents of which are hereby incorporated by reference.

BACKGROUND

1. Technical Field

The present invention relates to a travel control apparatus for a vehicle provided with a self-driving function which enables a vehicle to automatically turn to the right or turn to the left at an intersection along a target course, on a basis of travel environment information and travel information of the vehicle.

2. Related Art

In the related art, with regard to turn of a vehicle at an intersection, various driving assistance techniques have been developed and practically utilized. For instance, Japanese Unexamined Patent Application Publication No. 2005-189983 discloses a technique as follows. A road surface friction coefficient (road surface μ) of a road surface on which a vehicle travels is estimated, and a time required when the vehicle travels a right turn completion distance required for completing right turn after starting the right turn at an acceleration corresponding to the road surface μ is calculated as a right turn completion time. On the basis of the right turn completion time, a possibility of collision between the vehicle and other vehicles is determined so as to perform alarm control and acceleration/deceleration control of the vehicle.

Incidentally, in recent years, a self-driving technique has been developed and practically utilized. This self-driving has the following possibility. When the vehicle makes a turn at the intersection while crossing ahead of an oncoming vehicle, for instance, in a case where the turn is automatically controlled in response to a relative distance between an oncoming vehicle and the vehicle, and in a case where a road surface condition shows a low μ road, the vehicle's tire may slip during the turn, and the targeted acceleration cannot be obtained. Therefore, in a case where the oncoming vehicle is present, the vehicle may come into contact with the oncoming vehicle. In addition, if the vehicle has an in-vehicle traction control mounted for preventing tire slippage by decreasing a drive torque in response to a tire slippage state, in a case where the road surface condition shows the low μ road, the drive torque is frequently decreased due to an operation of the traction control. The acceleration becomes discontinuous during the right turn control, thereby vibrating the vehicle. Consequently, there is a possibility that occupants of the vehicle may feel anxiety or discomfort.

SUMMARY OF THE INVENTION

It is desirable to provide a travel control apparatus for a vehicle which enables a vehicle to turn while crossing ahead of an oncoming vehicle even on a low μ road at a drive torque suitable for safety when turn is controlled by means of self-driving control, and which can restrain occupants from feeling anxiety or discomfort by smoothly accelerating the vehicle during the right turn.

An aspect of the present invention provides a travel control apparatus for a vehicle including a travel environment information acquisition unit that acquires travel environment information of a traveling vehicle, a travel information detection unit that detects travel information of the vehicle, and a control unit that performs self-driving control, on a basis of the travel environment information and the travel information of the vehicle. The traveling environment information is information on a traveling environment in which the vehicle travels. The control unit detects a relative distance between an oncoming vehicle and the vehicle, and performs turn control to cause the vehicle to make a turn while crossing ahead of the oncoming vehicle, in a case where the relative distance is equal to or greater than a preset threshold value. When the vehicle makes the turn while crossing ahead of an oncoming vehicle, in a case where a traction control for preventing tire slippage by decreasing a drive torque is operated, the control unit increasingly corrects the preset threshold value in accordance with at least a tire grip state.

In a case where the traction control is operated, the control unit may estimate a self-driving request drive torque at which the traction control is not operated in accordance with the tire grip state, and perform the turn at the estimated self-driving request torque.

In a case where the vehicle awaits the turn since the traction control is operated when the turn is performed, the control unit may determine whether or not the vehicle is located at a safe position on a lane, and await the turn in a case where the vehicle is located at the safe position.

The tire grip state may be determined, on a basis of a road surface friction coefficient between a tire and a road surface.

DETAILED DESCRIPTION

Hereinafter, an example according to the present invention will be described with reference to the drawings. The example describes a case where a vehicle turns right while crossing ahead of an oncoming vehicle, in a traffic system whereby vehicles move on the left side of a road.

Figure 1:
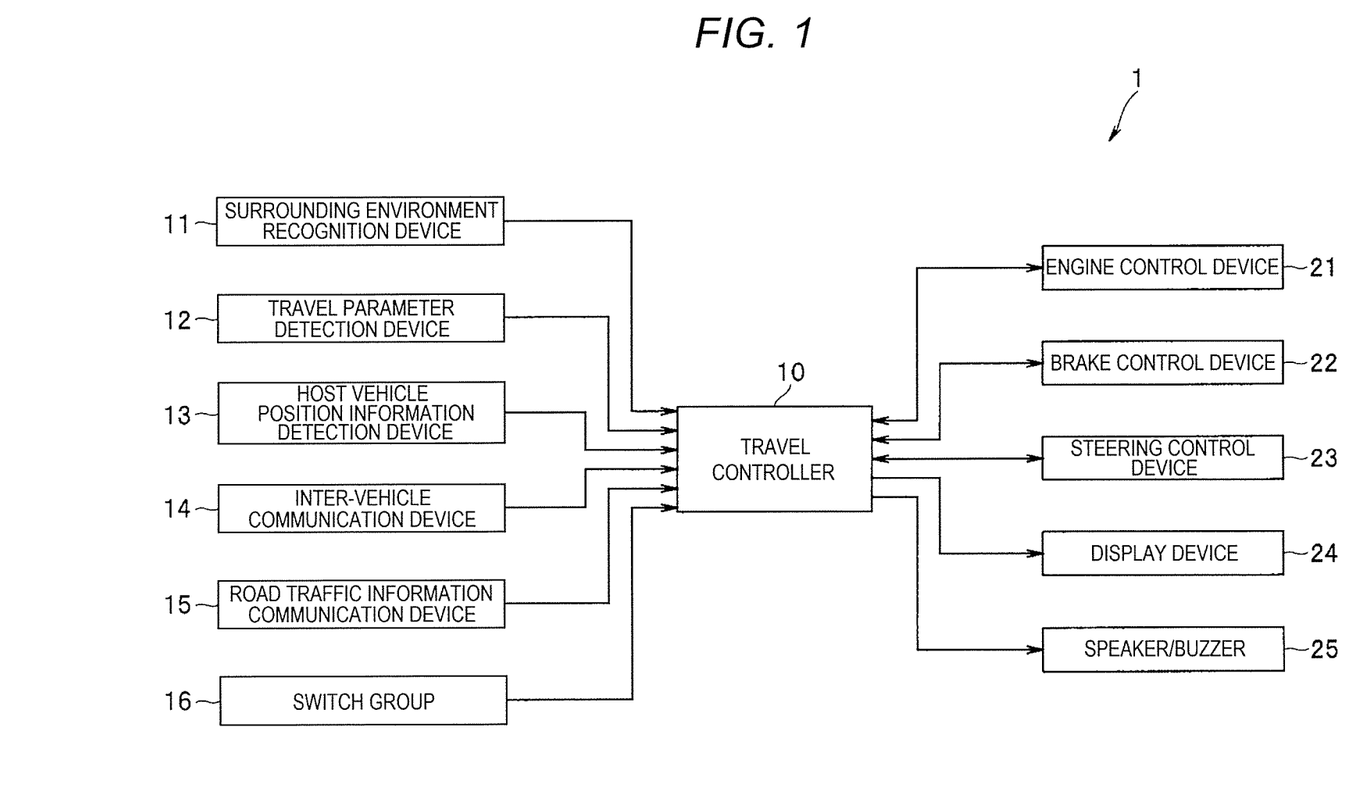
FIG. 1 is an overall configuration diagram of a travel control apparatus for a vehicle according to an example of the present invention.

Referring to FIG. 1, the reference numeral 1 represents a travel control apparatus for a vehicle. In the travel control device 1, various input devices such as a surrounding environment recognition device 11, a travel parameter detection device 12, a vehicle position information detection device 13, an inter-vehicle communication device 14, a road traffic information communication device 15, and a switch group 16 are coupled to a travel controller 10. In addition, various output devices such as an engine control device 21, a brake control device 22, a steering control device 23, a display device 24, and a speaker/buzzer 25 are coupled to the travel controller 10.

The surrounding environment recognition device 11 is configured to include a camera device (stereo camera, monocular camera, color camera, and the like) including a solid-state imaging device disposed in a vehicle compartment, which acquires image information by imaging an external environment of a vehicle, a radar device (laser radar, millimeter-wave radar, and the like) which receives a reflected wave from a three-dimensional object present around the vehicle, a sonar, and the like (hitherto, not illustrated).

For instance, on the basis of the image information captured by the camera device, the surrounding environment recognition device 11 performs a known grouping process on distance information, and compares the distance information subjected to the grouping process with preset three-dimensional road shape data or three-dimensional object data. In this manner, on the basis of lane mark line data, side wall data relating to guardrails or curbstones present along a road, and three-dimensional object data relating to vehicles, the surrounding environment recognition device 11 extracts a relative position (distance and angle) from the vehicle together with a speed.

In addition, on the basis of reflected wave information acquired by the radar device, the surrounding environment recognition device 11 detects a position (distance and angle) of the wave reflected three-dimensional object together with the speed. In one example of the present invention, the surrounding environment recognition device 11 may serve as a "travel environment information acquisition unit".

The travel parameter detection device 12 detects travel information of the vehicle. Specifically, the travel information includes a vehicle speed, longitudinal acceleration, lateral acceleration, a steering torque, a steering wheel angle, a yaw rate, an accelerator position, a throttle position, a road surface gradient of a travel road surface, an estimated value of a road surface friction coefficient, ON-OFF of a brake pedal switch, ON-OFF of an accelerator pedal switch, ON-OFF of a turn signal switch, ON-OFF of a hazard lamp switch, and the like. In one example of the present invention, the travel parameter detection device 12 may serve as a "travel information detection unit".

For instance, the vehicle position information detection device 13 is a known navigation system. For instance, the vehicle position information detection device 13 receives a radio wave transmitted from a global positioning system (GPS) satellite, and detects the current position, on the basis of the radio wave information and self-contained navigation information using a vehicle speed signal obtained from an acceleration sensor, a gyro, and the rotation of the tire. The vehicle position information detection device 13 identifies a vehicle position on map data stored in advance in a flash memory, a compact disc (CD), a digital versatile disc (DVD), a Blu-ray (registered trademark) disc, a hard disk drive (HDD), and the like.

As the map data stored in advance, the vehicle position information detection device 13 has road data and facility data. The road data includes position information and type information of a link, position information and type information of a node, curve curvature (curve radius) information, and information relating to a connection relationship between the link and the node, that is, intersection information, road branch and junction information, and the maximum vehicle speed information in a branch road. The facility data has multiple records for each facility. Each record has data indicating name information, location information, facility type (each type of department stores, shops, restaurants, parking lots, parks, and repair bases for vehicle's malfunctions) information of a target facility. Then, the vehicle position on the map position is displayed. If a destination is input by an operator, a route from a starting place to the destination is calculated in a predetermined manner. The route is displayed in the display device 24 such as a display, and a monitor. Alternatively, the speaker/buzzer 25 performs voice guidance so as to freely guide the route. In one example of the present invention, the vehicle position information detection device 13 may serve as a "travel environment information acquisition unit".

For instance, the inter-vehicle communication device 14 is configured to include a short range wireless communication device having a communication area of approximately 100 m such as a wireless LAN. The inter-vehicle communication device 14 directly communicates with other vehicles without a server intervening therebetween, and can transmit and receive information. Then, through mutual communication with other vehicles, vehicle information, travel information, and traffic environment information are exchanged therebetween. The vehicle information includes specific information indicating vehicle types (in the present example, vehicle models such as passenger vehicles, trucks, and two-wheeled vehicles). In addition, the travel information includes vehicle speed and position information, lighting information of a brake lamp, flashing information sent by a direction indicator at the time of right turn and left turn, and flashing information of a hazard lamp flashing at the time of emergency stop. Furthermore, the traffic environment information includes road traffic jam information and information varying depending on a situation such as construction information. In one example of the present invention, the inter-vehicle communication device 14 may serve as a "travel environment information acquisition unit".

The road traffic information communication device 15 is a so-called vehicle information and communication system (VICS: registered trademark), and is a device which receives real time road traffic information relating to traffic jams, accidents, construction work, a required time, and parking lots through FM multiplex broadcasting or from a transmitter on the road, and which displays the received traffic information on the above-described map data stored in advance. In one example of the present invention, the road traffic information communication device 15 may serve as a "travel environment information acquisition unit".

The switch group 16 is a switch group relating to driving support control for drivers. For instance, the switch group 16 is configured to include a switch for travel control at a preset fixed speed, a switch for control the vehicle to travel to follow a preceding vehicle while an inter-vehicle distance from the preceding vehicle and an inter-vehicle time are maintained to a preset fixed value, a switch for lane keeping control to control the vehicle to keep the lane by maintaining a travel lane to a set lane, a switch for lane deviation preventing control to prevent the vehicle from deviating from the travel lane, a switch for overtaking control permission switch to permit the vehicle to overtake the preceding vehicle (overtaking target vehicle), a switch for self-driving control to cooperatively perform all these controls, a switch for setting a vehicle speed, an inter-vehicle distance, an inter-vehicle time, and a limited speed which are required for each control, or a switch for releasing each control.

For instance, the engine control device 21 is a known control unit which performs main control on a vehicle engine (not illustrated) such as fuel injection control, ignition timing control, and control for an electronic control throttle valve, on the basis of an intake air amount, a throttle position, an engine coolant temperature, an intake air temperature, oxygen concentration, a crank angle, an accelerator position, and other vehicle information items. In addition, for instance, the engine control device 21 is configured to perform known traction control for decreasing a drive force (decreasing a drive torque) so that a tire slippage rate reaches a preset target slippage rate, in a case where predetermined slippage occurs in drive wheels. Then, in a self-driving state, in a case where an acceleration (requested acceleration) required for each self-driving control described above (control for preventing collision with obstacles, constant speed travel control, following travel control, lane keeping control, lane deviation preventing control, and additionally overtaking control) is input from the travel controller 10, the engine control device 21 calculates a drive torque (self-driving request torque), on the basis of the requested acceleration, and performs engine control in which the self-driving request torque is set to a target torque.

For instance, the brake control device 22 is a known control unit which can control a brake device (not illustrated) of four wheels independently of a driver's brake operation, on the basis of a brake switch, a wheel speed of the four wheels, a steering wheel angle, a yaw rate, and other vehicle information items, and which performs yaw brake control to control a yaw moment added to the vehicle such as known ABS control and sideslip prevention control. In addition, in a self-driving state, in a case where a deceleration (requested deceleration) required for each self-driving control described above (control for preventing collision with obstacles, constant speed travel control, following travel control, lane keeping control, lane deviation preventing control, and additionally overtaking control) is input from the travel controller 10, the brake control device 22 sets target fluid pressure of a wheel cylinder of each wheel brake, on the basis of the requested deceleration, and performs brake control.

For instance, the steering control device 23 is a known control device which controls an assist torque generated by an electric power steering motor (not illustrated) disposed in a vehicle steering system, on the basis of a vehicle speed, a steering torque, a steering wheel angle, a yaw rate, and other vehicle information items. In addition, the steering control device 23 can perform lane keeping control for travel control in which the above-described travel lane is maintained as the set lane, lane deviation preventing control to prevent the vehicle from deviating from the travel lane, and self-driving steering control to cooperatively perform these controls. A steering angle or a steering torque required for the lane keeping control, the lane deviation preventing control, and the self-driving steering control is calculated by the travel controller 10, and is input to the steering control device 23. In accordance with the input control amount, the electric power steering motor is controlled and driven.

For instance, the display device 24 is a device which gives a visual warning or notice to a driver, such as a monitor, a display, and an alarm lamp. In addition, the speaker/buzzer 25 is a device which gives an auditory warning or notice to a driver.

Then, on the basis of each input signal from the above-described respective devices 11 to 16, the travel controller 10 performs the self-driving control by cooperatively performing the control for preventing collision with obstacles, the constant speed travel control, the following travel control, the lane keeping control, the lane deviation preventing control, and the additionally overtaking control. In a self-driving state, when performing turn control for the vehicle in a state of stopping at an intersection, the travel controller 10 causes the vehicle to turn to the right while crossing ahead of an oncoming vehicle in a case where a relative distance Lt between the oncoming vehicle and the vehicle is equal to or greater than a preset threshold value (turn available distance) Ltd. When the vehicle turns to the right under the turn control, in a case where the traction control for preventing tire slippage by decreasing the drive torque is operated, the travel controller 10 increasingly corrects the turn available distance Ltd in response to at least a tire grip state. In addition, in a case where the traction control is operated, the travel controller 10 estimates a self-driving request drive torque at which the traction control is not operated in response to the tire grip state, and causes the vehicle to turn to the right at a self-driving request torque TAt estimated as described above. In one example of the present invention, the travel controller 10 may serve as a "control unit".

Figure 2:
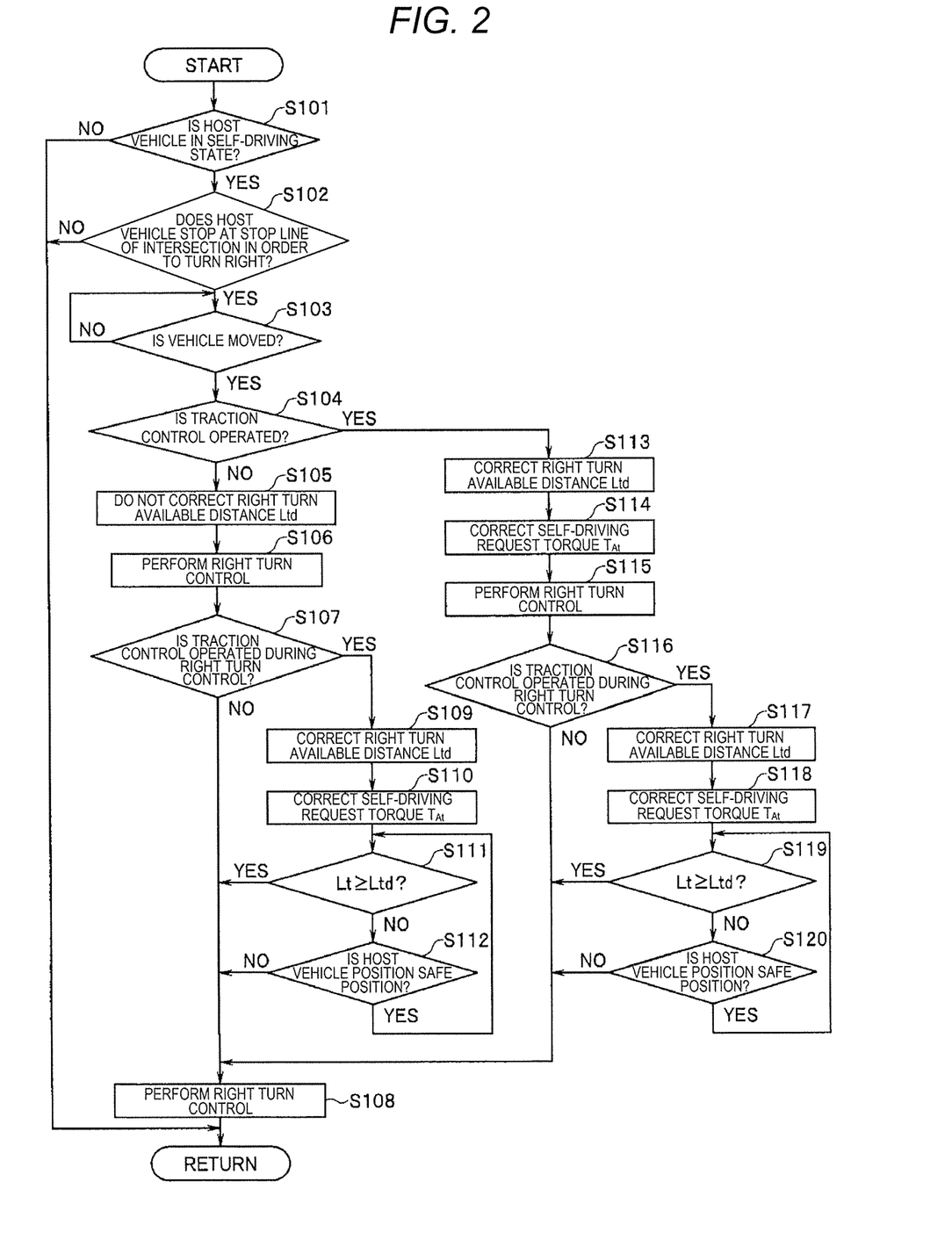
FIG. 2 is a flowchart of a self-driving control program according to the example of the present invention.

Next, a self-driving control program executed by the travel controller 10 will be described with reference to a flowchart in FIG. 2.

First, in Step (hereinafter, abbreviated as "S") 101, it is determined whether or not the vehicle is in a self-driving state. In a case where the vehicle is not in the self-driving state, the program is finished. In a case of the self-driving state, the process proceeds to S102.

Figure 6:
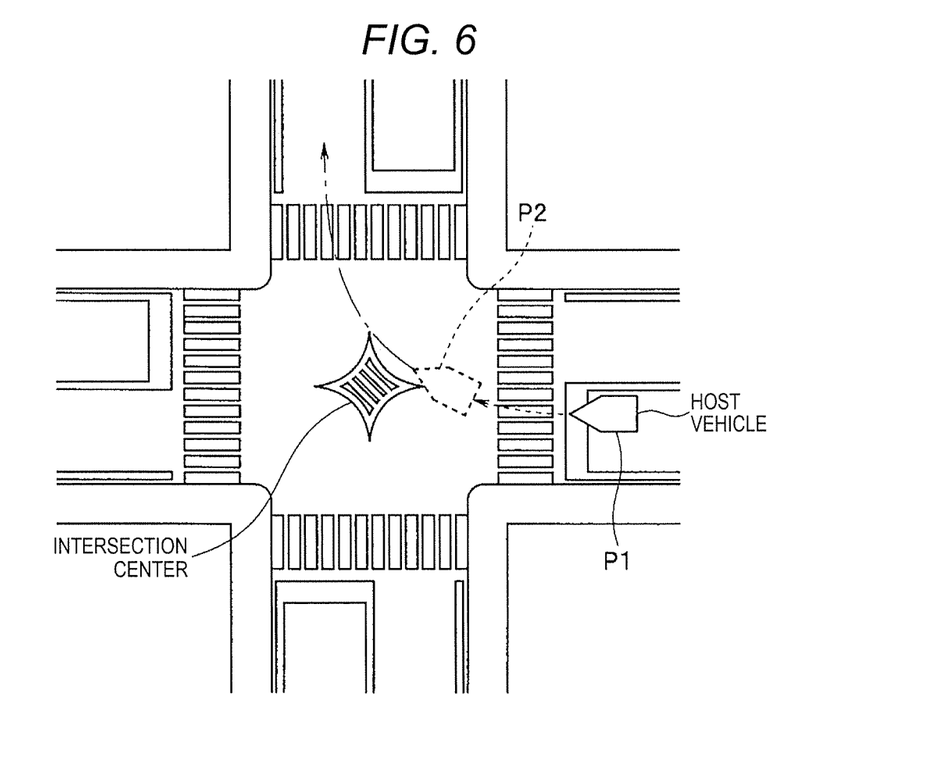
FIG. 6 is a view for describing a right turn routine at an intersection according to the example of the present invention.

If the process proceeds to S102, it is determined whether or not the vehicle stops at a stop line of the intersection in order to turn to the right while crossing ahead of the oncoming vehicle. Specifically for the example for the traffic system whereby vehicles move on the left side of a road and the vehicle crosses ahead of the oncoming vehicle upon making a right turn, the intersection is recognized from map information or image information. In a case where the vehicle speed is approximately zero and the turn signal switch is turned on in the rightward direction, it is recognized that the vehicle stops at the stop line of the intersection in order to turn to the right while crossing ahead of the oncoming vehicle (for instance, a situation at a position P1 in FIG. 6). A target place for the turn control is not limited to the above-described intersection. For instance, the target place may be determined as a place for performing the turn control in a case where the vehicle substantially stops (vehicle speed is approximately zero) close to a lane opposite to the lane of the vehicle and the turn signal switch is turned on in the rightward direction.

Next, the process proceeds to S103 so as to determine whether or not the vehicle moves from the stop state. If the vehicle is not moved, the process awaits until the vehicle is moved. In a case where the vehicle is moved, the process proceeds to S104.

In S104, when the vehicle starts to move, it is determined whether or not the traction control is operated.

Figure 3:
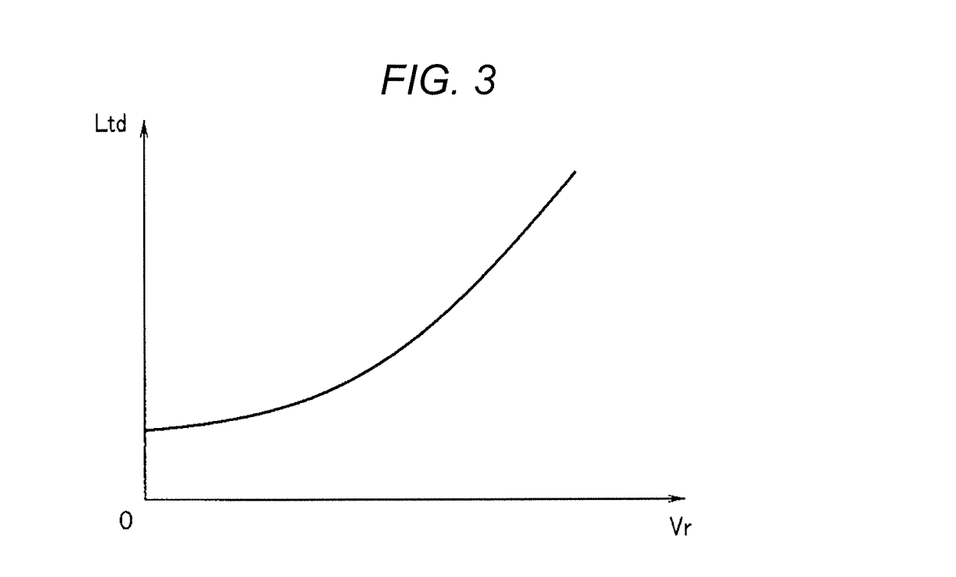
FIG. 3 is a characteristic diagram of a right turn available distance according to the example of the present invention.

As a determination result in S104, in a case where the traction control is not operated, the process proceeds to S105. Without correcting the preset turn available distance Ltd, the process proceeds to S106. For instance, the turn available distance Ltd is preset through experiments or calculations by using a relative speed Vr between the oncoming vehicle and the vehicle as illustrated in FIG. 3.

Then, if the process proceeds to S106, a traveling path for right turn is set, on the basis of a right turn destination lane and the current lane (or on the basis of a guide route provided by the navigation system). The traveling path for right turn is determined as a target course so as to set a steering angle. The target steering angle is output to the steering control device 23. Furthermore, the preset self-driving request torque TAt for right turn is generated by the engine control device 21 so as to cause the vehicle to turn to the right. In this manner, the turn control is performed. As described above, the turn control is performed so that the vehicle turns to the right in a case where the relative distance Lt between the oncoming vehicle and the vehicle is equal to or greater than the preset threshold value (turn available distance) Ltd.

Subsequently, the process proceeds to S107. As illustrated by a position P2 in FIG. 6, it is determined whether or not the traction control is operated during the turn control. In a case where the traction control is not operated, the process proceeds to S108 so as to continuously perform the turn control. Then, the program is finished.

In addition, if on the basis of determination in S107, it is determined that the traction control is operated, the process proceeds to S109 so as to correct the preset turn available distance Ltd. The turn available distance Ltd is corrected in response to the tire grip state. In this example, as the tire grip state, the turn available distance Ltd is corrected in accordance with a road surface friction coefficient $\mu$ between the tire and the road surface.

Specifically, in accordance with the road surface friction coefficient $\mu$, a turn available distance correction gain Glh is set. The preset turn available distance Ltd is multiplied by the turn available distance correction gain Glh so as to correct the turn available distance Ltd.

Figure 4:
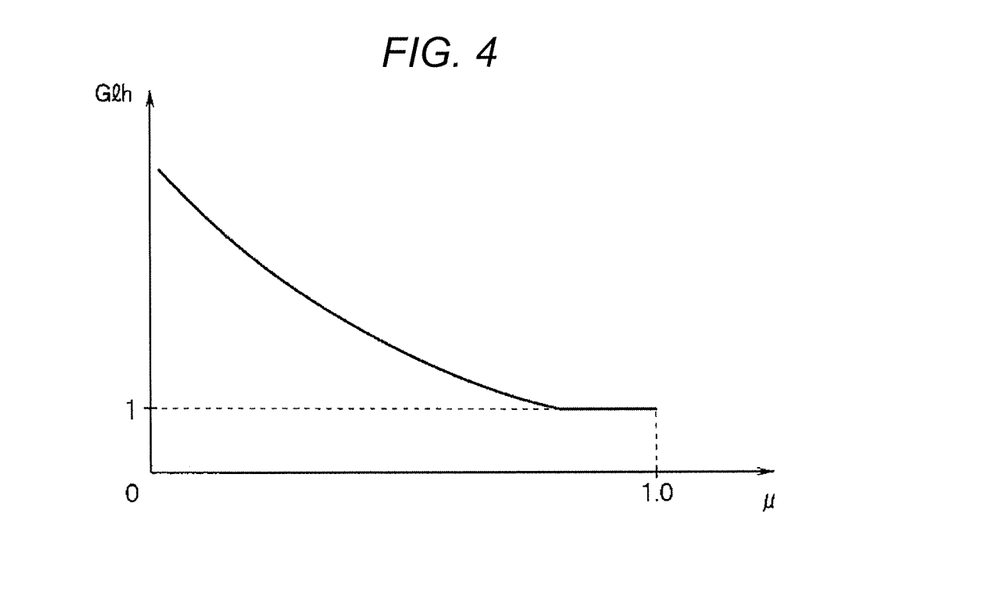
FIG. 4 is a characteristic diagram of a right turn available distance correction gain according to the example of the present invention.

As illustrated in FIG. 4, the turn available distance correction gain Glh is a value of 1 or greater, and is set to a value increasing as the road surface friction coefficient $\mu$ becomes lower. Therefore, as the road surface friction coefficient $\mu$ becomes lower, the turn available distance Ltd is corrected to a longer distance. In this manner, the turn control is performed with a more safe margin, compared to when the vehicle turns to the right on a normal road surface. Therefore, consideration is given to delayed driving due to the operation of the traction control on the low $\mu$ road or insufficient acceleration due to tire slippage, thereby improving safety of the turn control in the self-driving control.

After the turn available distance Ltd is corrected in S109, the process proceeds to S110 so as to correct the self-driving request torque TAt. The self-driving request torque TAt is corrected in accordance with the tire grip state. In this example, the self-driving request torque TAt is corrected in accordance with the road surface friction coefficient $\mu$ between the tire and the road surface.

Figure 5:
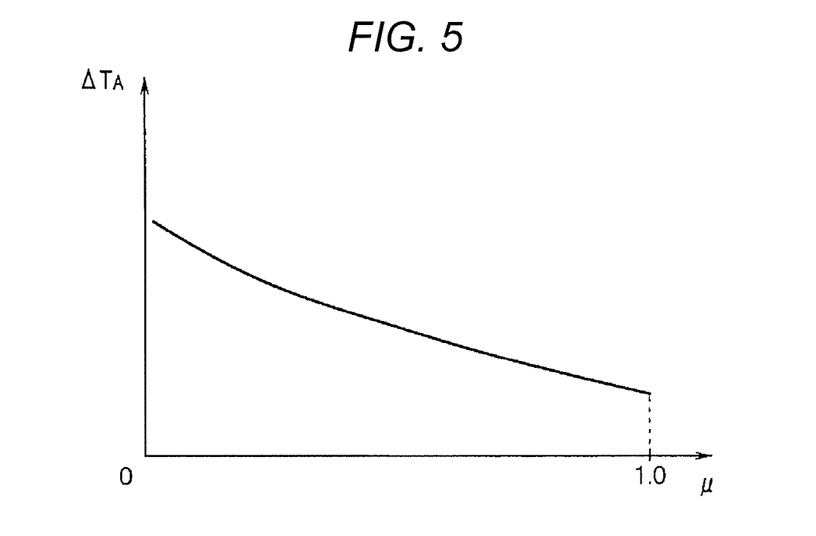
FIG. 5 is a characteristic diagram of a self-driving request torque correction amount according to the example of the present invention.

Specifically, in accordance with the road surface friction coefficient $\mu$, a decreased torque amount $\Delta$TA of the self-driving request torque TAt is set, and the decreased torque amount $\Delta$TA is subtracted from the set self-driving request torque TAt (TAt-$\Delta$TA). Then, the subtracted value (TAt-$\Delta$TA) is set to a self-driving request drive torque at which the traction control is not operated. The subtracted value (TAt-$\Delta$TA) is compared with the minimum torque value required for starting the vehicle which is preset through experiments or calculations so as to set the greater torque value to the self-driving request torque TAt.

Therefore, in a case where the traction control is operated, the self-driving request drive torque TAt at which the traction control is not operated is set thereafter. Accordingly, this configuration prevents insufficient acceleration or discontinuous acceleration caused by the traction control operated again. The vehicle is allowed to smoothly travel, thereby effectively preventing occupants from feeling anxiety or discomfort due to the generated vehicle vibrations.

Subsequently, the process proceeds to S111. The relative distance Lt between the oncoming vehicle and the vehicle is compared with the turn available distance Ltd. In a case where the relative distance Lt between the oncoming vehicle and the vehicle is equal to or greater than the turn available distance Ltd (Lt≥Ltd), the process proceeds to S108 so as to continuously perform the turn control. Then, the program is finished.

On the other hand, in a case of Lt<Ltd, the process proceeds to S112 so as to determine whether or not the vehicle position is a safe position.

Specifically, the safe position is obtained by using a movement amount (value from a wheel speed sensor) of the vehicle. In a case where the movement amount is small and the vehicle seldom moves from a right turn standby place, it is determined that the vehicle is present at the safe position.

Then, as a determination result in S112, in a case where the vehicle position is the safe position, that is, in a case where the vehicle seldom moves from the right turn standby place, it is determined that the vehicle can safely await the right turn. The process returns to S111, and awaits until Lt≥Ltd is satisfied.

On the other hand, in a case where it is determined that the vehicle position is not the safe position, it is expected that the movement amount of the vehicle is large and the road surface friction coefficient $\mu$ becomes higher as the vehicle is enabled to move. Accordingly, in order to prevent the contact with the oncoming vehicle, the process proceeds to S108. The turn control is performed so as to be quickly separated from the opposite lane.

On the other hand, in a case where it is determined that the traction control is operated in S104 described above, after the vehicle starts to move the process proceeds to S113. The preset turn available distance Ltd is corrected by using a method similar to that in S109 described above.

Subsequently, the process proceeds to S114. The self-driving request torque TAt is corrected by using a method similar to that in S110 described above.

Subsequently, the process proceeds to S115 so as to perform the turn control, and the process proceeds to S116. As illustrated by the position P2 in FIG. 6, it is determined whether or not the traction control is operated. In a case where the traction control is not operated, the process proceeds to S108 so as to continuously perform the turn control. Then, the program is finished.

In addition, if on the basis of determination in S116, it is determined that the traction control is operated, the process proceeds to S117. The preset turn available distance Ltd is corrected by using a method similar to that in S109 described above.

Subsequently, the process proceeds to S118. The self-driving request torque TAt is corrected by using a method similar to that in S110 described above.

Subsequently, the process proceeds to S119. The relative distance Lt between the oncoming vehicle and the vehicle is compared with the turn available distance Ltd. In a case where the relative distance Lt between the oncoming vehicle and the vehicle is equal to or greater than the turn available distance Ltd (Lt≥Ltd), the process proceeds to S108 so as to perform the turn control. Then, the program is finished.

On the other hand, in a case of Lt<Ltd, the process proceeds to S120 so as to determine whether or not the vehicle position is the safe position.

Then, as a determination result in S120, in a case where the vehicle position is the safe position, that is, in a case where the vehicle seldom moves from the right turn standby place, it is determined that the vehicle can safely await the right turn. The process returns to S119, and awaits until Lt≥Ltd is satisfied.

On the other hand, in a case where it is determined that the vehicle position is not the safe position, it is expected that the movement amount of the vehicle is large and the road surface friction coefficient μ becomes higher as the vehicle is enabled to move. Accordingly, in order to prevent the contact with the oncoming vehicle, the process proceeds to S108. The turn control is performed so as to be quickly separated from the opposite lane.

As described above, according to an example of the present invention, in a self-driving state, when the turn control is performed for the vehicle in a state of stopping at an intersection, the vehicle is caused to turn to the right in a case where the relative distance Lt between the oncoming vehicle and the vehicle is equal to or greater than the turn available distance Ltd. When the vehicle turns to the right under the turn control, in a case where the traction control for preventing tire slippage by decreasing the drive torque is operated, the turn available distance Ltd is increasingly corrected in response to at least the tire grip state. In addition, in a case where the traction control is operated, the travel controller 10 estimates a self-driving request drive torque at which the traction control is not operated in response to the tire grip state, and causes the vehicle to turn to the right at the self-driving request torque TAt estimated as described above.

Specifically, as the road surface friction coefficient μ indicating the tire grip state becomes lower, the turn available distance Ltd is corrected to a longer distance. In this manner, the turn control is performed with a more safe margin, compared to when the vehicle turns to the right on a normal road surface. Accordingly, consideration is given to delayed driving due to the operation of the traction control on the low μ road or insufficient acceleration due to tire slippage, thereby improving safety of the turn control in the self-driving control. In addition, in accordance with the road surface friction coefficient μ, the decreased torque amount ΔTA of the self-driving request torque TAt is set, and the decreased torque amount ΔTA is subtracted from the set self-driving request torque TAt. Then, the subtracted value is set to the self-driving request drive torque at which the traction control is not operated. The subtracted value is compared with the minimum torque value required for starting the vehicle which is preset through experiments or calculations so as to set the greater torque value to the self-driving request torque TAt. Therefore, in a case where the traction control is operated, the self-driving request drive torque TAt at which the traction control is not operated is set thereafter. Accordingly, this configuration prevents insufficient acceleration or discontinuous acceleration caused by the traction control operated again. The vehicle is allowed to smoothly travel, thereby effectively preventing occupants from feeling anxiety or discomfort due to the generated vehicle vibrations.

The example describes the case where the vehicle crosses ahead of the oncoming vehicle upon making a right turn in a traffic system whereby vehicles move on the left side of a road. This present invention is also applicable to a case where the vehicle crosses ahead of the oncoming vehicle upon making a left turn in a traffic system whereby vehicles move on the right side of a road.

The invention claimed is:

1. A travel control apparatus for a vehicle comprising:
   a control unit that:
   acquires, from one or more sensors, environment information surrounding the vehicle;
   performs self-driving control based on the environment information and travel information of the vehicle;
   determines that a distance between an oncoming vehicle and the vehicle is equal to or greater than a threshold distance;
   responsive to determining that the distance between an oncoming vehicle and the vehicle is equal to or greater than the threshold distance, performs turn control to cause the vehicle to make a turn while crossing ahead of the oncoming vehicle;
   when a traction control for preventing tire slippage is operated when the vehicle makes the turn, 1) increasingly adjusts the threshold distance in accordance with at least a tire grip state and 2) sets a value of a drive torque to prevent the traction control to further operate, the value of the drive torque being at which the traction control does not operate according to at least the tire grip state;
   when the distance between the oncoming vehicle and the vehicle is equal to or greater than the adjusted threshold distance, performs the turn of the vehicle at the self-driving request drive torque so that the traction control does not operate during the turn; and
   when the distance between the oncoming vehicle and the vehicle is smaller than the adjusted threshold distance, 1) determines whether or not the vehicle is located at a safe position on a lane and 2) when the vehicle is determined to be located at the safe position of the lane, allows the vehicle to await to make the turn.

2. The travel control apparatus for a vehicle according to claim 1,
   wherein the tire grip state is determined, on a basis of a road surface friction coefficient between a tire and a road surface.

\* \* \* \* \*